US012159509B2

(12) United States Patent
Shigeta

(10) Patent No.: US 12,159,509 B2
(45) Date of Patent: *Dec. 3, 2024

(54) MANAGEMENT SYSTEM FOR TABLE GAME

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,362

(22) Filed: Oct. 12, 2023

(65) Prior Publication Data

US 2024/0046745 A1 Feb. 8, 2024

Related U.S. Application Data

(63) Continuation of application No. 17/667,836, filed on Feb. 9, 2022, now Pat. No. 11,830,320, which is a continuation of application No. 16/796,465, filed on Feb. 20, 2020, now Pat. No. 11,282,335.

(30) Foreign Application Priority Data

Feb. 21, 2019 (JP) ................................ 2019-045249

(51) Int. Cl.
*G07F 17/32* (2006.01)

(52) U.S. Cl.
CPC ...... *G07F 17/3241* (2013.01); *G07F 17/3239* (2013.01)

(58) Field of Classification Search
None
See application file for complete search history.

(56) References Cited

U.S. PATENT DOCUMENTS 4,814,589 A 3/1989 Storch et al.
5,651,548 A 7/1997 French
7,295,114 B1 11/2007 Drzaic et al.
(Continued)

FOREIGN PATENT DOCUMENTS

CN 107683494 A 2/2018
EP 3422307 A1 1/2019
(Continued)

OTHER PUBLICATIONS

Japanese Office Action dated Dec. 5, 2023 issued in JP Application 2020-027646.
(Continued)

*Primary Examiner* — Kevin Y Kim
(74) *Attorney, Agent, or Firm* — NORTON ROSE FULBRIGHT US LLP

(57) ABSTRACT

A management system for a table game includes a function in which the type and the number of bet game tokens are determined independently in bet areas including at least a player bet area and a banker bet area based on an image analysis result by an image analyzer and it is determined whether the total amount of money or the total number of game tokens every sitting number or in each of the read areas based on the image analysis result by the image analyzer is matched with the total amount of money or the total number of game tokens every sitting number or in each of the read areas based on the read result by a chip reader.

20 Claims, 15 Drawing Sheets

(56) References Cited

U.S. PATENT DOCUMENTS

| | | | |
|---|---|---|---|
| 8,092,293 | B2 | 1/2012 | Richards et al. |
| 10,217,312 | B1 | 2/2019 | McClellan et al. |
| 2005/0026680 | A1 | 2/2005 | Gururajan |
| 2008/0113783 | A1 | 5/2008 | Czyzewski et al. |
| 2009/0075725 | A1 | 3/2009 | Koyama |
| 2012/0282998 | A1 | 11/2012 | Emori et al. |
| 2015/0312517 | A1 | 10/2015 | Hoyt et al. |
| 2018/0068525 | A1 | 3/2018 | Shigeta |
| 2018/0114406 | A1 | 4/2018 | Shigeta |
| 2020/0193772 | A1 | 6/2020 | Shigeta |

FOREIGN PATENT DOCUMENTS

| | | | |
|---|---|---|---|
| JP | 2017018501 | A | 1/2017 |
| WO | 2017022767 | A1 | 2/2017 |
| WO | 2018025885 | A1 | 2/2018 |
| WO | 2019021820 | A1 | 1/2019 |

OTHER PUBLICATIONS

European Search Report dated Jul. 29, 2020 issued in EP application 20158559.3.
Chinese Office Action dated Aug. 11, 2022 issued in CN application 202111225047.4.
European Search Report dated Jul. 24, 2023 issued in EP application 20158559.3.

THERE IS DOUBT OF FRAUD OR FAULTY GAME TOKEN COIN

| | | | | | |
|---|---|---|---|---|---|
| TOTAL NUMBER OF READS USING CAMERA | 0 | 4 | 1 | 2 | 4 |
| TOTAL NUMBER OF READS USING RFID | 0 | 4 | 2 | 2 | 3 |
| SITTING NUMBER | 6 | 5 | 3 | 2 | 1 |

THERE IS DOUBT OF FAULTY READ BY CAMERA DUE TO BLIND SPOT ETC.

FIG.2

READ RESULTS OF CHIPS IN BET AREA

| | | | | | |
|---|---|---|---|---|---|
| PLACE AND ID OF BET CHIPS | ONE FOR BANKER (ID3) | TWO FOR BANKER (ID12 AND ID13)<br>TWO FOR BANKER PAIR (ID6 AND ID18) | TWO FOR PLAYER (ID29 AND ID54) | ONE FOR BANKER PAIR (ID75)<br>ONE FOR PLAYER PAIR (ID77) | ONE FOR BANKER (ID97)<br>ONE FOR PLAYER PAIR (ID68) |
| READ RESULT USING CAMERA | ONE FOR BANKER | TWO FOR BANKER | TWO FOR PLAYER | NOT AVAILABLE | ONE FOR BANKER<br>ONE FOR PLAYER PAIR |
| READ RESULT USING RFID (READ ID) | ID3 | ID6, 12, 13, 18 | ID29, 54 | NOT AVAILABLE | ID68, 97 |
| SITTING NUMBER | 6 | 5 | 3 | 2 | 1 |

| | |
|---|---|
| GAME RESULT DETERMINED BY GAME RESULT DETERMINATION DEVICE | BANKER WINS |
| ID DETERMINED BY CHIP TRAY DETERMINATION DEVICE AS CHIPS ARE INCREASED BEFORE AND AFTER COLLECTION | ID6, 18, 29, 54, 68, 75, 77 |

FIG.4

THERE IS DOUBT OF FRAUD OR FAULTY GAME TOKEN COIN

MISMATCH WITH AMOUNT OF MONEY THAT HAS TO BE PAID (DOUBT OF ERROR)

| | | | | | |
|---|---|---|---|---|---|
| TOTAL NUMBER OF CHIPS THAT HAVE TO BE PAID | 0 | 0 | 2 | 0 | 4 |
| TOTAL NUMBER OF READS USING CAMERA | 0 | 0 | 2 | 0 | 3 |
| TOTAL NUMBER OF READS USING RFID | 0 | 0 | 1 | 0 | 3 |
| SITTING NUMBER | CONFIRMATION AREA FOR 6 | CONFIRMATION AREA FOR 5 | CONFIRMATION AREA FOR 3 | CONFIRMATION AREA FOR 2 | CONFIRMATION AREA FOR 1 |

FIG.8

MANAGEMENT SYSTEM FOR TABLE GAME

CROSS REFERENCE TO RELATED APPLICATION

This application is a continuation of U.S. patent application Ser. No. 17/667,836 filed Feb. 9, 2022, which is a continuation of U.S. patent application Ser. No. 16/796,465 filed Feb. 20, 2020 (now issued U.S. Pat. No. 11,282,335), which claims priority to JP Pat. App. 2019-45249 filed Feb. 21, 2019, the entire contents of each disclosure are hereby incorporated by reference.

FIELD

The present disclosure relates to a management system for a table game that avoids the use of fraud game tokens in a gaming house in casinos and other game facilities where game tokens are used.

BACKGROUND

In gaming houses, such as casinos, attempts are made to detect and avoid cheating at table games or to detect and avoid errors or cheating in betting game tokens or in making a pay adjustment.

For the casino, it is important to find a fraud game token at a point in time when the game token is placed on a game table. U.S. Pat. No. 5,651,548 A discloses a technique in order to avoid the use of a fake game token 1 in which an RFID tag is attached to a game token, an RFID attached game token that is bet on a table is read, and it is determined whether the game token is a fake or not.

Conventionally, attempts are made in which an RFID antenna is embedded in a casino game table, ID information is read, and thus it is recognized which bet area the RFID attached game token is bet. However, the reading of the game token based on such a previously existing technique, when a game token with no RFID attached or a game token with a broken RFID is placed in the first place, a problem arises in that it is not enabled to recognize that the game token is present or it is not enabled to recognize a fraud or faulty game token is present. There is a concern that it is not enabled to detect a game token with no RFID attached or with a broken RFID attached, leading to a problem to be solved.

In a conventional layout for reading an RFID as shown in FIG. 14, a problem arise in that a player area and a banker area have to be widely separate or a problem arises in that reading individual side bets is not enabled. A problem arises in that embedding individual RFID antennas increases costs.

SUMMARY

Therefore, an object of the present disclosure is to provide a management system for a table game having an object in which based on an image captured by a camera device, positions and types of game tokens placed on a game table and the number of these game tokens are determined and a fraud or faulty game token can be detected using RFID.

In order to solve the conventional problems, a management system for a table game according to the present disclosure has: a game token having an RFID individually identifiable; a game table on which a game is played using the game token; a game recorder configured to record game tokens bet by game participants in a game played at the game table as images through a camera; an image analyzer configured to subject the recorded image of the game token to image analysis; a chip reader configured to read an RFID of the game token bet by game participants; and a controller configured to determine an image analysis result by the image analyzer and a read result by the chip reader. The game table includes a plurality of bet areas including at least a player bet area and a banker bet area every sitting number. The chip reader is configured to read the game token within one read area formed of a whole bet area of a sitting number, for each sitting number, or the chip reader is configured to read the game token within each of a plurality of areas separated from the whole bet area, a number of the plurality of areas is smaller than a number of the bet areas. The controller is configured to determine a type and a number of bet game tokens independently in bet areas including at least the player bet area and the banker bet area based on the image analysis result by the image analyzer, the controller is configured to determine whether a total amount of money or a total number of game tokens every sitting numbers or in each of the read areas based on the image analysis result by the image analyzer is matched with a total amount of money or a total number of game tokens every sitting numbers or in each of the read areas based on the read result of the chip reader, and the controller is configured to output a determined result.

The controller may be configured to output a sitting number having the determined result that is not matched.

The controller may be configured to generate a signal indicating a possibility that an RFID attached to the game token is broken or a game token does not have an RFID when a total amount of money or a total number of game tokens every sitting numbers based on the read result of the chip reader is smaller than a total amount of money or a total number of game tokens every sitting numbers based on the image analysis result by the image analyzer.

The controller may be further configured to generate a signal indicating a possibility of a read error of the game token by the image analyzer when a total amount of money or a total number of game tokens every sitting numbers based on the read result of the chip reader is greater than a total amount of money or a total number of game tokens every sitting numbers based on the image analysis result by the image analyzer.

The management system for a table game may include a database configured to store an ID of an RFID of the game token. The controller may be configured to check an ID of an RFID based on the read result of the chip reader against an ID stored on the database, to determine whether the game token is a fake or not, and to output a determined result.

The management system for a table game may include a chip tray configured to retain a game token used by a dealer at the game table; a chip tray determination device configured to determine a type and a number of game tokens accommodated in the chip tray; and a game result determination device configured to determine game results of games at the game table. The controller may have a calculation function in which an income and expenditure of a casino side at the game table are calculated every collection and redemption of games using a measurement result of a position, an amount of money, and a number of game tokens based on a game result obtained from the game result determination device and the image analysis result by image analyzer. The controller may have a collection determination function in which after collection of loss game tokens bet by game participants is finished, an amount of money of game tokens that have to be collected which are calculated from positions, types, and a number of game tokens that are bet by game participants at the game table, the game result is compared with an actually collected amount of money in the chip tray, it is determined whether a difference is present between an amount of money of game tokens that have to be collected and an actually collected amount of money, and it is determined whether a fraud or an error occurs in collection of game tokens, and a redemption determination function in which a game token that has to be redeemed is redeemed, after redemption is finished, a total amount that has to be present on the chip tray based on an amount of money of game tokens that have to be redeemed at the game calculated from positions, types, and a number of game tokens that are bet by game participants at the game table and the game result is compared with an actual total amount on the chip tray, and when it is determined that a difference is present between a total amount that has to be present and an actual total amount, it is determined that a fraud or an error occurs in redemption.

The controller may be configured to identify the collected game token every sitting number based on information on an ID of an RFID of the game token that is collected and determined by the chip tray determination device and information on an ID of an RFID of the game token read by the chip reader, the controller may be configured to compare an ID or an amount of money or a number of game tokens that are identified with an ID or an amount of money or a number of game tokens that have to be collected every sitting number determined using a measurement result of a position, an amount of money, and a number of game tokens based on a game result obtained from the game result determination device and the image analysis result by the image analyzer, and the controller may be configured to determine whether the amount of money or the number of game tokens is matched.

The controller may be configured to determine a type classified for each use application or each use purpose of the game token based on information on an ID of an RFID of the game token read by the chip reader in each of games, and the controller may be configured to store an amount of bet money or an amount of money collected or redeemed every of the type of the game token every sitting number.

In a plurality of games, the controller may be configured to store an accumulating total amount of bet money or an accumulating total amount of collected or redeemed money every type of the game token every sitting number.

A type of the game token may include at least one of cash chip, rolling chip, and promotion chip.

The controller may be configured to identify an owner based on ID information on the rolling chip and to store an accumulating total amount of money of the rolling chip that is bet or an accumulating total amount of collected or redeemed money every owner.

The chip reader may be configured to read the game token for redemption placed on the chip reader every sitting number. The controller may be configured to compare an amount of money for redemption determined using a measurement result of a position, an amount of money, and a number of game tokens based on a game result obtained from the game result determination device and the image analysis result by the image analyzer with an amount of money of the game token placed every sitting numbers based on the read result of the chip reader, the controller may be configured to determine whether an amount of money for redemption is matched or not, and the controller may be configured to output the determination.

The controller may be configured to display a result that is not matched when a determined result of the amount of money for redemption is not matched. The controller may be configured to again make a determination and to again output a result that is matched or not when an amount of money of the game token placed on the chip reader every sitting numbers read by the chip reader is changed.

The controller may be configured to compare an amount of money of the game token for redemption placed every sitting numbers with amounts of an increase and a decrease on the chip tray before and after redemption, and the controller is configured to determine whether a difference is present.

The chip reader may include a payment confirmation area disposed on a dealer side of the bet area, the payment confirmation area on which the game token for redemption is placed.

The management system for a table game may further include a game participant identification unit by a face recognition system or a player ID card. The controller may be configured to link the sitting number with information on the game participant identified by the game participant identification unit.

The management system for a table game may further include a display device configured to perform display based on an output from the controller.

The game table may further include a side-bet bet areas. each of the side-bet bet area may be provided adjacently with bet areas of each sitting number. The chip reader may be configured to collectively read at least one of the side-bet bet areas. The controller may be configured to determine a type and a number of game tokens bet in the at least one side-bet bet area based on the image analysis result by the image analyzer, the controller may be configured to determine whether a total amount of money or a total number of game tokens in the at least one side-bet bet area based on the image analysis result by the image analyzer is matched with a total amount of money or a total number of game tokens in the side-bet bet area based on the read result of the chip reader, and the controller may be configured to output a signal indicating a determined result.

Another embodiment of the present disclosure is a management system for a table game having: a game token having an RFID individually identifiable; a game table on which a game is played using the game token; a game recorder configured to record game tokens bet by game participants in a game played at the game table as images through a camera; an image analyzer configured to subject the recorded image of the game token to image analysis; a chip reader configured to read an RFID of the game token bet by game participants; and a controller configured to determine an image analysis result by the image analyzer and a read result of the chip reader.

The game table includes a bet area formed of a player bet area, a banker bet area, and a side-bet bet area. The side-bet bet area is provided adjacently with bet areas every sitting number. The chip reader is configured to collectively read at least one of the side-bet bet areas. The controller is configured to independently determine a type and a number of bet game tokens in the at least one side-bet bet area based on the image analysis result by the image analyzer, the controller is configured to determine whether a total amount of money or a total number of game tokens in the at least one side-bet bet area based on the image analysis result by the image analyzer is matched with a total amount of money or a total number of game tokens in the side-bet bet area based on the read result of the chip reader, and the controller is configured to output a signal indicating a determined result.

The controller may be configured to output the side-bet bet area having the determined result that is not matched.

The controller may be further configured to generate a signal indicating a possibility that an RFID of the game token is broken or a game token does not have an RFID when a total amount of money or a total number of game tokens in each of the side-bet bet area based on the read result of the chip reader is smaller than a total amount of money or a total number of game tokens in each of the side-bet bet area based on the image analysis result by the image analyzer.

The controller may be configured to generate a signal indicating a possibility of a read error of the game token by the image analyzer when a total amount of money or a total number of game tokens in each of the side-bet bet area based on the read result of the chip reader is greater than a total amount of money or a total number of game tokens in each of the side-bet bet area based on the image analysis result by the image analyzer.

The management system for a table game may further include a database configured to store an ID of an RFID of the game token. The controller may be configured to check an ID of an RFID based on the read result of the chip reader against an ID stored on the database, and the controller may be configured to determine whether the game token is a fake or not.

The controller may be configured to identify the game token collected in each of the side-bet bet area based on information on an ID of an RFID of the game token that is collected and determined by the chip tray determination device and information on an ID of an RFID of the game token read by the chip reader, the controller may be configured to compare an ID or an amount of money or a number of game tokens that have to be collected in each of the side-bet bet area determined using a measurement result of a position, an amount of money, and a number of game tokens based on a game result obtained from the game result determination device and the image analysis result by the image analyzer with an ID or an amount of money or a number of game tokens that are collected in each of the side-bet bet area, and the controller may be configured to determine whether a collected amount of money is matched or not.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 2 is a view showing read results of chips by a camera and RFID according to an embodiment of the present disclosure.

FIG. 4 is a view showing states of game tokens bet at game tables according to an embodiment of the present disclosure.

FIG. 8 is a view showing read results of chips by a camera and RFID according to an embodiment of the present disclosure.

DETAILED DESCRIPTION OF NON-LIMITING EMBODIMENTS

Figure 1:
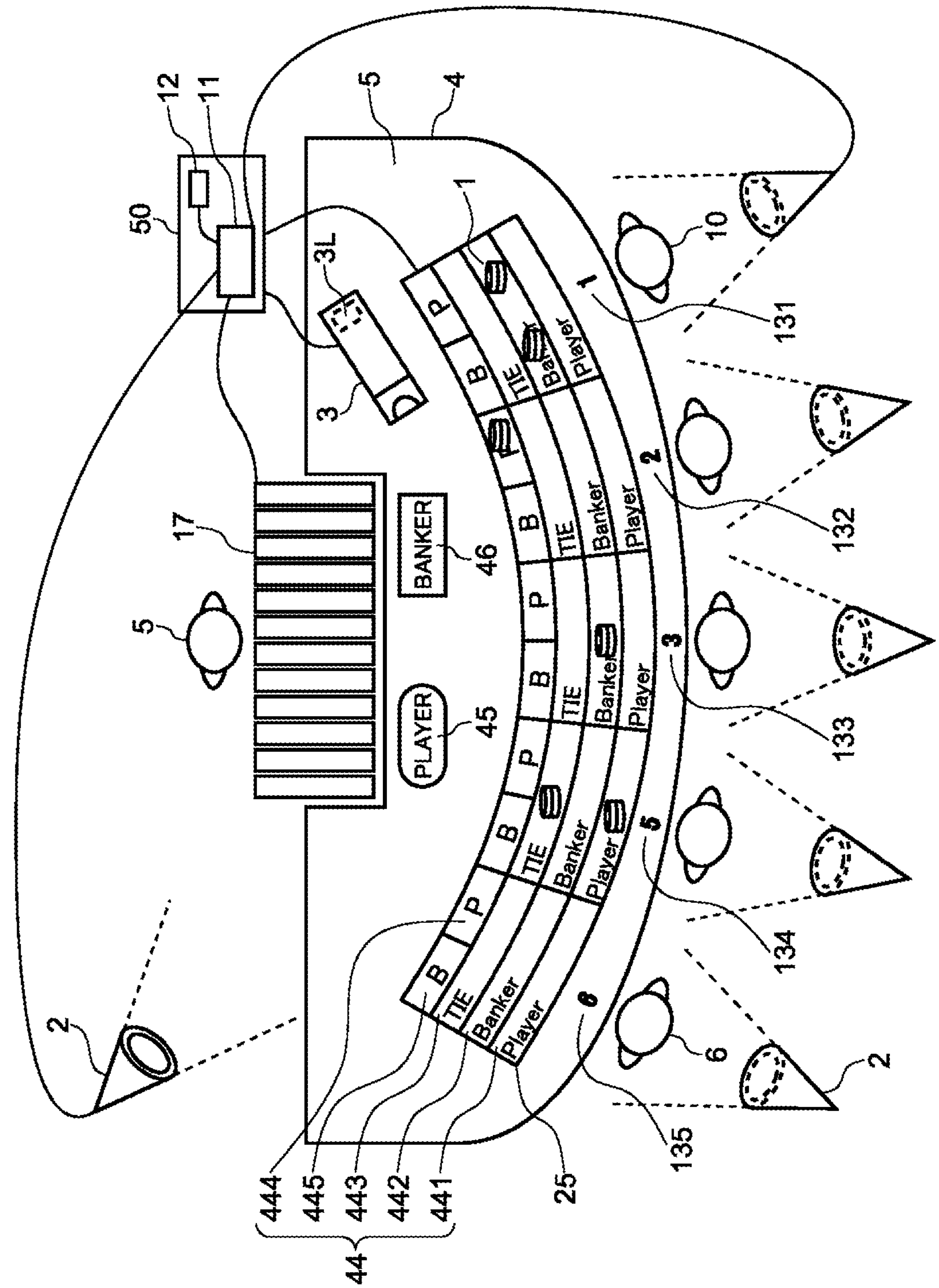
FIG. 1 is a view showing the outline of an overall management system for a table game at a gaming house having a plurality of game tables according to an embodiment of the present disclosure.

In the following, the outline of an overall management system for a table game in a gaming house having a plurality of game tables according to an embodiment of the present disclosure will be described. Embodiments in which chip type game tokens are used as an example of the game token will be described, and the game token is also called as chip in the following. FIG. 1 is a view showing the outline of the overall management system. A management system for a table game in a gaming house having a plurality of game tables 4 includes a game recorder 11 that records, as images, games played at the game table 4 including game tokens 1 through a plurality of cameras 2, an image analyzer 12 that analyzes recorded images, a chip reader 25 that reads RFID attached to the game token 1, and a game result determination device 18 that determines and displays the game results of games at the game table 4.

The game result determination device 18 is a card distributor 3, for example, that is a so-called electronic shoe used among persons skilled in the art. The card distributor 3 is structured in which game rules are programmed on before-hand, information on a card C that is distributed is read, and a game outcome can be determined. For example, in baccarat games, a banker win, a player win, and a tie (draw) are basically determined by the ranks of two to three cards, and a determined result (outcome result) is displayed using a result display lamp 13.

In FIG. 1, the game table 4 is a baccarat table, at which five sitting numbers 13 (a “sitting number 1” 131, a “sitting number 2” 132, a “sitting number 3” 133, a “sitting number 5” 134, and a “sitting number 6” 135) are provided, and five game participants can participate in a game. A bet area 44 is provided every sitting number 13. The bet area 44 of the sitting number 13 includes the areas of a player (PLAYER) 441, a banker (BANKER) 442, the tie (TIE) 443, a player pair (P) 444, and a banker pair (B) 445. The game participants make a bet by placing the game token 1 in an amount for betting at a position corresponding to a bet target. In FIG. 1, for example, two game tokens 1 are placed at the tie 443 and two game tokens 1 are placed at the player 441 at the sitting number 5 for betting. The game table 4 is provided with a player card area 45 in which player cards (or player hands) drawn from the shoe is placed and a banker card area 46 in which banker cards (or banker hands) drawn from the shoe is placed.

A controller 14 can determine, through the camera 2 and the image analyzer 12, which positions in a betting area 8 players 6 bet game tokens 1, the types of bet game tokens 1 (the different values of amounts are allocated to each color of the game tokens 1), and the number of game tokens 1. That is, the controller 14 can determine that two game tokens 1 are bet at the tie 443 at the sitting number 5, and two game tokens 1 are bet at the player 441, for example.

As shown in FIG. 1, the entire bet area of each sitting number is regarded as one read area, and the chip reader 25 is disposed such that the RFIDs of the game tokens 1 in a read area can be read collectively. On RFID attached to the game token 1, unique ID information, the amount of money of the game token 1, a type, production information, owner information, and any other information are written. Alternatively, in a database, the ID information and the amount of money of the game token 1, the type, the production information, the owner information, and any other information may be stored with these pieces of information linked. The chip reader 25 reads RFID attached to the game token 1, and thus can determine the game tokens 1 every sitting number, and can determine the total amount of money or the number of game tokens 1. That is, for example, four game tokens are bet at the sitting number 5, and the types, amount of money, and IDs of these four game tokens can be determined.

As shown in FIG. 2, the controller 14 determines the total amount of money or the total number of game tokens 1 every sitting number from the types of game tokens 1 and the number of game tokens 1 that are bet in the bet areas of each of the sitting numbers based on image analysis results by the image analyzer 12, compares the total amount of money or the total number of game tokens 1 with the total amount of money or the total number of game tokens 1 every sitting number based on RFID information on game tokens 1 that are read by the chip reader 25, and determines whether the total amounts of money and the total numbers are matched. The controller 14 can output the sitting number at which the determination is not matched, and can identify the sitting number at which there is a problem.

In the case in which the total amount of money or the total number of game tokens 1 every sitting number based on the read result by the chip reader 25 is smaller than the total amount of money or the total number of game tokens 1 every sitting number based on the image analysis result by the image analyzer, a possibility is thought that the RFID attached to the game token 1 is broken, RFID is not readable, or no RFID is attached to the game token 1. In FIG. 2, the total number of reads based on the image analysis result by the image analyzer 12 for the game tokens 1 that are bet at the sitting number 1 is four, whereas the total number of reads based on RFID reads by the chip reader 25 is three. Therefore, it is thought that the RFID of one game token 1 among four game tokens 1 that are bet at the sitting number 1 is non-readable.

In the case in which the total amount of money or the total number of game tokens 1 every sitting number based on the read result by the chip reader 25 is greater than the total amount of money or the total number of game tokens 1 every sitting number based on the image analysis result by the image analyzer, a possibility is thought that the image analyzer 12 fails to read the game token 1 due to a factor, such as the game token 1 in the blind spot of the camera. In FIG. 2, the total number of reads based on the image analysis result by the image analyzer 12 for the game token 1 that is bet at the sitting number 3 is one, whereas the total number of reads based on RFID reads by the chip reader 25 is two. Therefore, a possibility is thought that there are two game tokens 1 that are bet at the sitting number 3, but the image analyzer can recognize one game token 1 alone.

ID information on an RFID attached to game token 1 is registered on the database of the casino, and information on production and shipment at a factory, information on a receipt, validation, and activation at the casino are recorded. The controller 14 checks RFID information read by the chip reader 25 against information in the database, and can determine whether the game token 1 is a fake or not as the game token 1 is registered, which has to be used in the casino.

With this configuration, the type and the number of game tokens 1 that are bet in the bet areas are determined by the camera, and the game token 1 whose authenticity is a fraud or faulty game token 1 can be determined every sitting number based on RFID information on the game token 1 that is read by the chip reader 25.

The system further includes a game participant identification unit by a face recognition system or a player ID card. The controller 14 can link game participant information identified by the game participant identification unit with the sitting number. The controller 14 can store the bet amount of money, the redeemed or collected amount of money, and outcome information that are stored every sitting number every game participant. The controller 14 can collectively store information indicating that the game participant plays a plurality of games at a plurality of tables.

The controller 14 can determine the total amount of money of the game tokens 1 on a chip tray 17 of a dealer 5 at the game table 4 using a chip tray determination device 12. After the game is finished and payment is paid off, the controller 14 can compare and calculate whether the total amount of money of the game tokens 1 in the chip tray 17 is increased or not corresponding to the amount of money of collecting loss game tokens 1 that are bet by the players 6 and a payment 9W of win chips for a player 6W who wins the game according to a game outcome result. The chip tray determination device may determine the total amount of money of the game tokens 1 on the chip tray 17 by capturing game tokens 1 accommodated in the chip tray 17 using the camera 2 based on analysis by the image analyzer, or may detect the total amount of money of the game tokens 1 accommodated in the chip tray 17 by providing an RFID reader on the chip tray 17.

In this example, a fraud or an error is detected based on the game outcome result, information which type of game token 1 and how many game tokens 1 are bet at any position in the betting area 8 (the player, the banker, the tie, and the pair), and the amounts of an increase and a decrease in the game tokens 1 on the chip tray 17 after collecting loss chips and the redemption of win game tokens 1, and thus a fraud or an error can be detected without determining the movement of the game token 1 after the game is finished, i.e., the bet game token 1 moves to the player side or to the dealer side.

Here, in the case of baccarat, for example, the game outcome result can be determined according to the rules of baccarat by reading the rank of the card C put at the game at the card distributor 3. The game outcome result can be determined in which the top of the game table 4 is captured by the camera 2, the image is analyzed by the image analyzer 12, and the controller 14 checks the analysis result against the game rules. In this case, the camera 2 and the image analyzer 12 and the controller 14 constitute the game result determination device. Information on players at the sitting number 7, in formation indicating which type of game token 1 and how many game tokens 1 are bet at any position (the player, the banker, the tie, the player pair, and the banker pair) in the betting area 8 are obtained by capturing the game tokens 1 placed in the betting area 8 by the camera 2 and analyzing the images every play position 7 by the image analyzer 12.

The amounts of an increase and a decrease in the game tokens 1 on the chip tray 17 before and after the collection of loss game tokens 1 and the redemption of the win game tokens 1 can be calculated by the comparison of the total amount of money of the game tokens 1 in the chip tray 17 before the collection of loss game tokens 1 and the redemption of the win game tokens 1 with the total amount of money of the game tokens 1 in the chip tray 17 after the collection of loss game tokens 1 and the redemption of the win game tokens 1.

For example, it is assumed that the total amount of money of the game tokens 1 on the chip tray 17 is Bb before the game is started and the total amount of money of the game tokens 1 on the chip tray 17 after the game is finished and the collection of loss chips and the redemption of win chips are finished is Ba. In this game, it is assumed that the total amount of money of the game tokens 1 that are bet in the player area at all the play positions 7 is bp, the total amount of money of the game tokens 1 that are bet in the banker area at all the play positions 7 is bb, and the total amount of money of the game tokens 1 that are bet in the tie area at all the play positions 7 is bt. For example, in the case in which the game outcome result shows the banker wins, Ba−Bb=bp−bb+bt has to be held. Alternatively, the total amount Ba of the game tokens 1 on the chip tray 17 after the game is finished has to be (Bb+bp−bb+bt). In the case in which these are not held, it can be determined that a fraud or an error is made in the collection or the redemption of chips.

Figure 6A:
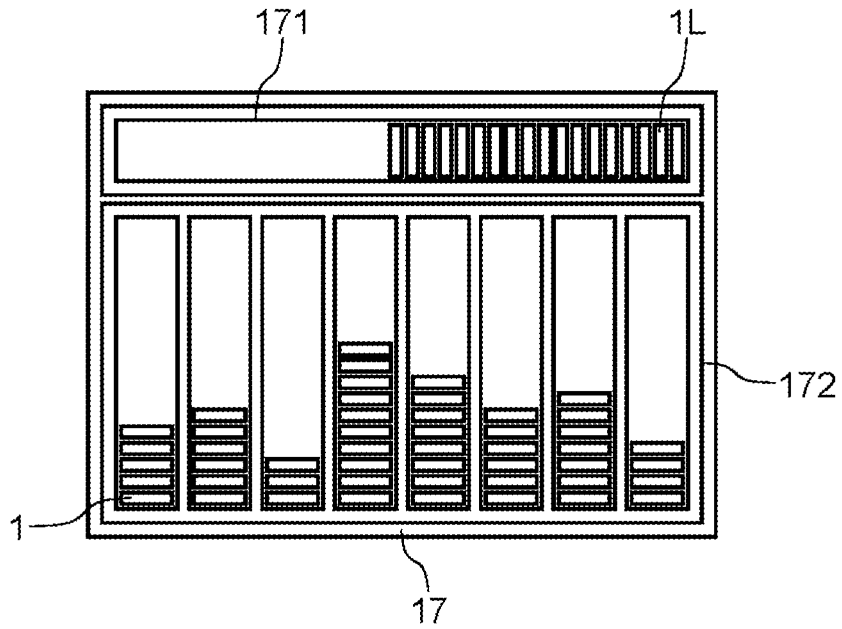
FIG. 6A is a view showing the detail of a chip tray according to a first embodiment of the present disclosure.
Figure 6B:
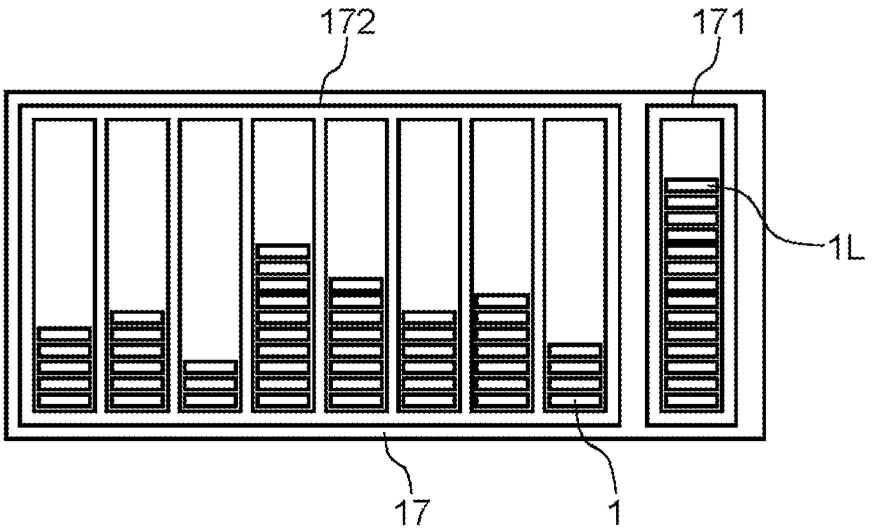
FIG. 6B is a view showing another example of a chip tray according to the first embodiment of the present disclosure.

FIG. 6A is a view showing the detail of the chip tray according to the present embodiment, and FIG. 6B is a view showing another example of the chip tray. The chip tray 17 is provided with a collection chip tray 171 on which a game token 1L bet by a player 6L who loses the game is collected and temporarily kept and a redemption chip tray 172 on which a game token 1W for redemption is kept. The image analyzer 12 and the controller 14 determine the positions, the types, and the number of game tokens 1L bets by the player 6L who loses the game, and calculate the amount of an increase in the game tokens 1L (the amount of the game tokens 1 that have to be present on the collection chip tray 171). The image analyzer 12 and the controller 14 further determine the actual total amount of money of the game tokens 1 on the chip tray 171 after collection, compare the total amount that has to be present with the actual total amount, and determine whether a difference is present.

The controller 14 further redeems the game token 1 that has to be redeemed. After redemption is finished, the controller 14 compares the total amount that has to be present on the chip tray based on the amount of money of chips that have to be redeemed at the game calculated from the positions, the types, and the number of chips that are bet by the game participants at the game table and the game result with the actual total amount on the chip tray, and it can be determined whether a difference is present between the total amount that has to be present and the actual total amount.

For the redemption of the game token 1W for the player 6W who wins the game, the game token 1 on the redemption chip tray 172 is used, and the image analyzer 12 and the controller 14 can reserve enough time to determine the actual total amount of money of the game tokens 1 on the collection chip tray 171 after collection.

As described above, in the present embodiment, the controller 14 calculates the income and expenditure of chips from the amount of money of bet chips on the game table 4 and the game outcome result every game, and verifies the amount of an increase in the balance of chips in the chip tray 17 after the game. When the controller 14 detects a difference in this verification, the controller 14 sends an alarm or adds a record about the difference on a video record captured by the camera 2. The casino operator can pursue the cause of the difference by confirming the video.

The management system for a table game according to the present embodiment adds and subtracts, to and from the total amount of money of the game tokens 1 on the chip tray 17 before payment is paid off at each game, the amounts of an increase and a decrease in chips at the game calculated from the positions, the types, and the number of game tokens 1 bet by all the players 6 at the game and a game outcome result obtained at the outcome result determination device, compares the total amount of money of the game tokens 1 that have to be present on the chip tray 17 after payment is paid off when the game is finished with the actual total amount of money of the game tokens 1 on the chip tray 17 obtained through the image analyzer 12 when the game is finished, and determines whether a difference is present between the total amount that has to be present and the actual total amount.

The controller 14 determines the positions, the types, and the number of chips bet by the players through the image analyzer 12, the controller 14 determines the actual total amount of money of chips on the chip tray when the collection of all loss chips bet by the players is finished, compares the total amount of money of the game tokens 1 that have to be present on the chip tray 17, obtained by adding the amount of an increase in the chip tray 17 at the game calculated from the positions, the types, and the number of chips bet by the player who loses the game to the total amount of money of chips on the chip tray before payment is paid off at each game, with the actual total amount of money of the game tokens 1 on the chip tray 17, and the controller 14 determines whether a difference is present between the total amount that has to be present and the actual total amount.

The controller 14 compares the total amount of money of the game tokens 1 that have to be present on the chip tray 17, obtained by adding the amount of an increase in the chip tray 17 at the game calculated from the positions, the types, and the number of game tokens 1 bet by the player who loses the game to the total amount of money of the game tokens 1 on the chip tray 17 before payment is paid off at each game, with the actual total amount of money of the game tokens 1 on the chip tray 17, and the controller 14 determines that no difference is present between the total amount that has to be present and the actual total amount. In the case in which the controller 14 compares the total amount that has to be present on the chip tray 17 after a pay adjustment is made when the game is finished with the actual total amount of money of the game tokens 1 on the chip tray 17 obtained through the image analyzer 12 when the game is finished and determines that a difference is present between the total amount that has to be present and the actual total amount, the controller 14 determines that a payment error is present, and the controller 14 generates a payment error signal that notifies a payment error.

The chip tray 17 is provided with the collection chip tray 171 that collects and temporarily keeps the game token 1 bet by the player who loses the game. The image analyzer 12 compares the total amount of money of the game tokens 1 that have to be present on the collection chip tray 171, to which the amount of an increase in the game token 1 at the game calculated from the positions, the types, and the number of game tokens 1L bet by the player who loses the game is added, with the actual total amount of money of the game tokens 1 on the collection chip tray 171, and the image analyzer 12 determines whether a difference is present between the total amount that has to be present and the actual total amount.

When the controller 14 determines a difference in which the actual total amount of money of the game tokens 1 that are determined on the chip tray 17 of the dealer 5 at the game table 4 does not correspond to the amounts of an increase and a decrease in chips calculated from the amount of money of chips bet by all the players and the game outcome result, the game recorder 11 can impose an index or a time instant to the acquired video or can identify and replay a collection scene or a payment scene of the game tokens 1 such that the game record where the difference occurs can be analyzed on the game recorder 11.

As described above, the controller 14 obtains the total amount of money of chips on the chip tray 17 after payment is paid off when the game is finished through the image analyzer 12. It is assumed that the determination after payment is paid off in this case is the determination when any situation 1) to 4) occurs: 1) the redemption of the win game tokens 1 is finished; 2) the card C used at the game is collected and discarded in a discard area 41 or a discard slot 42 at the table; 3) a predetermined button associated with the outcome result determination device is pressed; and 4) a marker 43 that indicates the outcome is returned to the original state.

The controller 14 has an artificial intelligence utilized structure or deep learning structure in which the controller 14 determines the position of the chip bet at the play positions 7 at the game table 4 (the position at which a bet is made on the player, the banker, and the pair) and the amount (the type and the number of chips), the controller 14 compares the outcome history of the players 6 obtained from the outcome results of games and the amount of the obtained chips (the amount of money of wins) with the statistical data of a large number of games in the past (big data), and the controller 14 can extract the situations as a singular situation (set by the casino). Typically, the controller 14 in an artificial intelligence utilized structure or deep learning structure is included in which situations that a win amount in a certain amount (one million dollars) or more occurs and that at a certain play position 7 at the game table 4, the amount of money of the bet chip is small when the game is lost and the amount of money of the bet chip is large when the game is won, which continues for a few games, are compared with statistical data of games (big data, for example), and these situations can be extracted as a singular situation.

The controller 14 of the management system for a table game has a structure in which the situation is extracted as a singular situation (integrally with the image analyzer 12) or the individual players 6 who win the game for a predetermined amount or more at the play position 7 can be identified. Such identification of the player 6 is obtained in which the image analyzer 12 obtains a face image as feature points by extraction, for example, and an identity number (ID, for example) is imposed for identification. The controller 14 has an alarm function that notifies the presence of the specific player at another game table when the player 6 leaves the table and arrives at the other game table. More specifically, a pit manager who manages the game tables 4 or a person in charge of tables (the dealer may be fine) is notified of the arrival to avoid a further singular phenomenon.

The controller 14 can identify the collected game token 1 every sitting number based on the ID information on the RFID of the collected game token 1 determined by the chip tray determination device and the ID information on the RFID of the game token 1 read by the chip reader 25.

Figure 3:
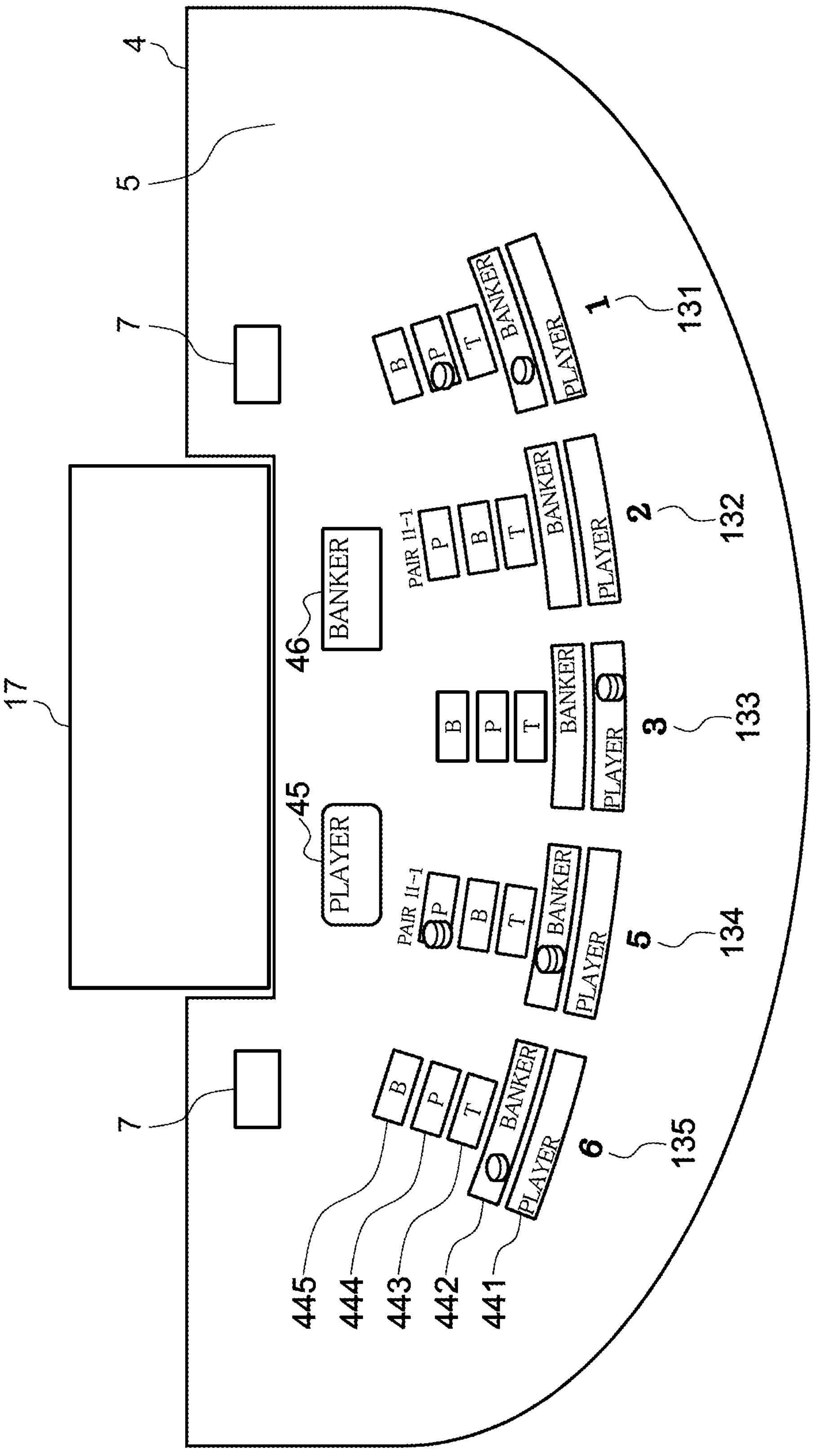
FIG. 3 is a view showing game tables according to an embodiment of the present disclosure.
Figure 5:
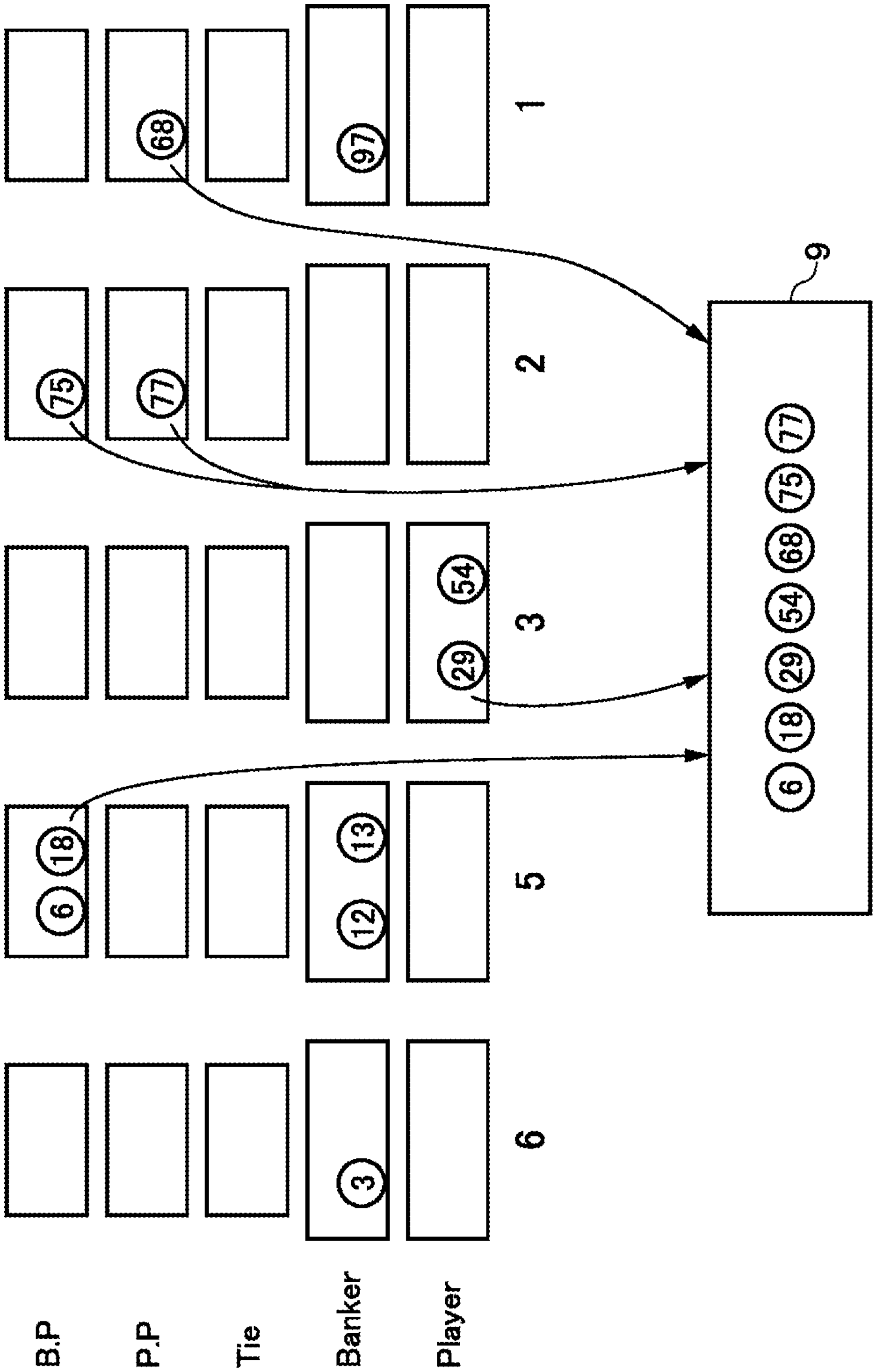
FIG. 5 is a view showing states of game tokens bet at game tables according to the embodiment of the present disclosure.

In FIG. 3, the game tokens 1 are bet as shown in FIGS. 4 and 5. In analysis by the image analyzer 12, places where the game token 1 is bet (the player, the banker, and the like) and the number of game tokens 1 (and the amount of money) can be determined. On the other hand, in read by the chip reader 25, the ID of RFID attached to the game token 1 every sitting number can be determined. Since the chip tray determination device 25 can determine the ID of the game token 1 in the chip tray 17, the chip tray determination device 25 can determine the collected game token 1 by determining the ID that is increased before and after collection. In the case in which the game result shows that the banker wins in FIGS. 3 to 5, it is revealed that two chips bet on the banker pair have to be collected from the analysis result by the image analyzer 12, and it is revealed that in the IDs of the collected chips determined by the chip tray determination device, two chips with ID 6 and ID 18 read by the chip reader 25, which are bet on the sitting number 5 are collected.

The controller 14 further determines the total amount of money or the total number of game tokens 1 that have to be collected every sitting number determined using the measurement result of the position, the amount of money, and the number of game tokens 1 based on the game result obtained from the game result determination device and the image analysis result by the image analyzer. Therefore, the controller 14 compares the total amount of money or the total number of collected game tokens 1 every sitting number determined based on an RFID with the total amount of money or the total number of game tokens 1 that have to be collected, and can determine whether the total amount of money or the total number is matched.

For example, in the case in which the read result by the chip reader 25 at the sitting number 1 shows "A, B, C, D, and E", the analysis result by the image analyzer 12 shows that "two chips on the tie, and two chips on the banker", the game result shows that "the banker wins", and the read result by the chip tray determination device 18 shows "A and B", it is revealed that chips A and B bet on the tie are correctly collected.

The controller 14 further can determine whether the ID information on the RFID of the collected game token 1 determined by the chip tray determination device is matched with the ID information on the RFID of the bet game token 1 read by the chip reader 25. By this determination, it can be determined whether the game token 1 collected on the chip tray is the game token 1 that is bet at the game table or whether the game token 1 collected on the chip tray is a game token 1 that is falsely collected from another place.

The controller 14 further can determine the types of chips, such as a cash chip, a rolling chip, and a promotion chip, based on RFID information read by the chip reader 25, and can store the amount of bet money and the amount of money collected or redeemed for each of the types of determined chips.

The rolling chip is a special chip that can be purchased by specific members and is non-exchangeable to cash, and the amount of money of the purchased rolling chip is managed fir every member. The rolling chip has to be consumed for use in betting, and the redemption for betting using the rolling chip is redeemed by the cash chip. The amount of money of the rolling chip that is bet or collected is stored based on RFID information read by the chip reader 25, and thus the amount of money of the rolling chip that has to be owned by the specific member can be determined.

Figure 7:
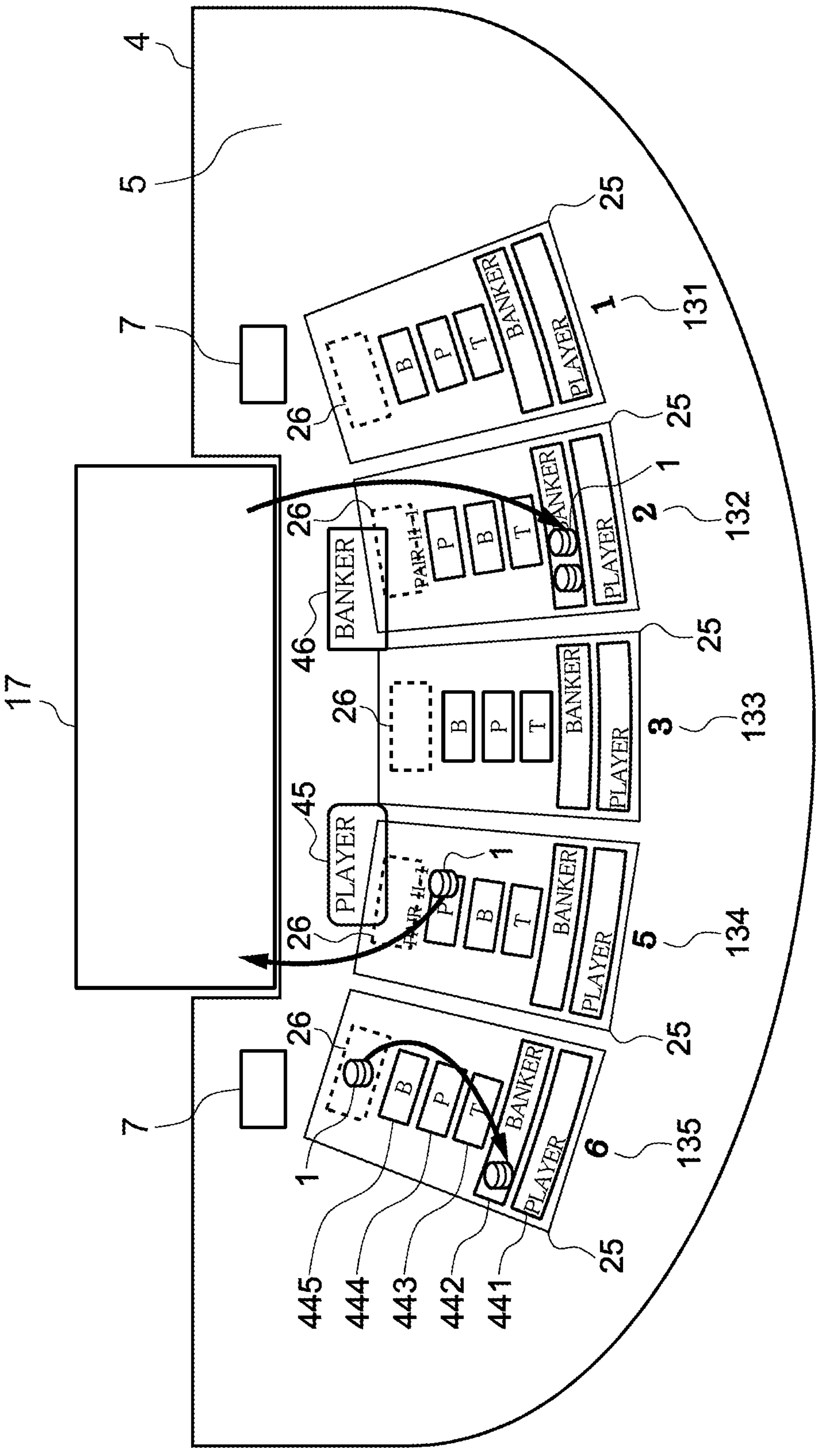
FIG. 7 is a view of game tables according to an embodiment of the present disclosure.

The chip reader 25 further includes the function of a confirmation area, and can read the game token 1 placed for redemption. As shown in FIG. 7, in the case in which a redemption is made to the banker at the sitting number 2, a game token 1 for redemption is placed in the chip reader 25 for reading. In FIG. 7, the game token 1 for redemption is placed next to a win game token 1 bet at the banker at the sitting number 2. The controller 14 compares the amount of money for redemption determined using the measurement result of the position, the amount of money, and the number of game tokens 1 based on the game result obtained from the game result determination device and the image analysis result by the image analyzer with the amount of money of the game token 1 placed every sitting number based on the read result by the chip reader 25, determines whether the amount of money for redemption is matched or not, and can output the result. In FIG. 8, the total number of game tokens 1 that has to be paid at the sitting number 1 is four, whereas the read result by the chip reader 25 is three, and thus the amount of money is not matched. In the case in which the amount of money for redemption is not matched, a non-matched signal is outputted, and the dealer can again place a game token 1 for redemption based on the outputted signal. In the case in which the game token 1 is again placed, determination is again made, and the determined result can be outputted. The area in which the game token 1 for redemption is placed is any place in the chip reader 25. As shown in FIG. 7, separately from the bet area, the payment confirmation area 26 may be disposed on the dealer side of the bet area. In FIG. 7, the game token 1 for redemption is placed in the payment confirmation area 26 at the sitting number 6, the chip reader 25 reads the game token 1 for redemption, the controller 14 makes determination, and the redemption chip is placed next to the win game token 1 placed at the banker.

A configuration may be provided in which the image analyzer 12 performs image analysis also on the confirmation area, the controller 14 checks the image analysis against the read result by the chip reader 25, and it is determined whether the total number of game tokens 1 is matched.

The controller 14 can output a signal based on the determination performed. The signal may be sent such that signal indication is displayed on the display unit of the chip tray 17 or the display unit of the card distributor 13, or the signal may be outputted to the pit manager or the back yard of the casino.

Figure 9:
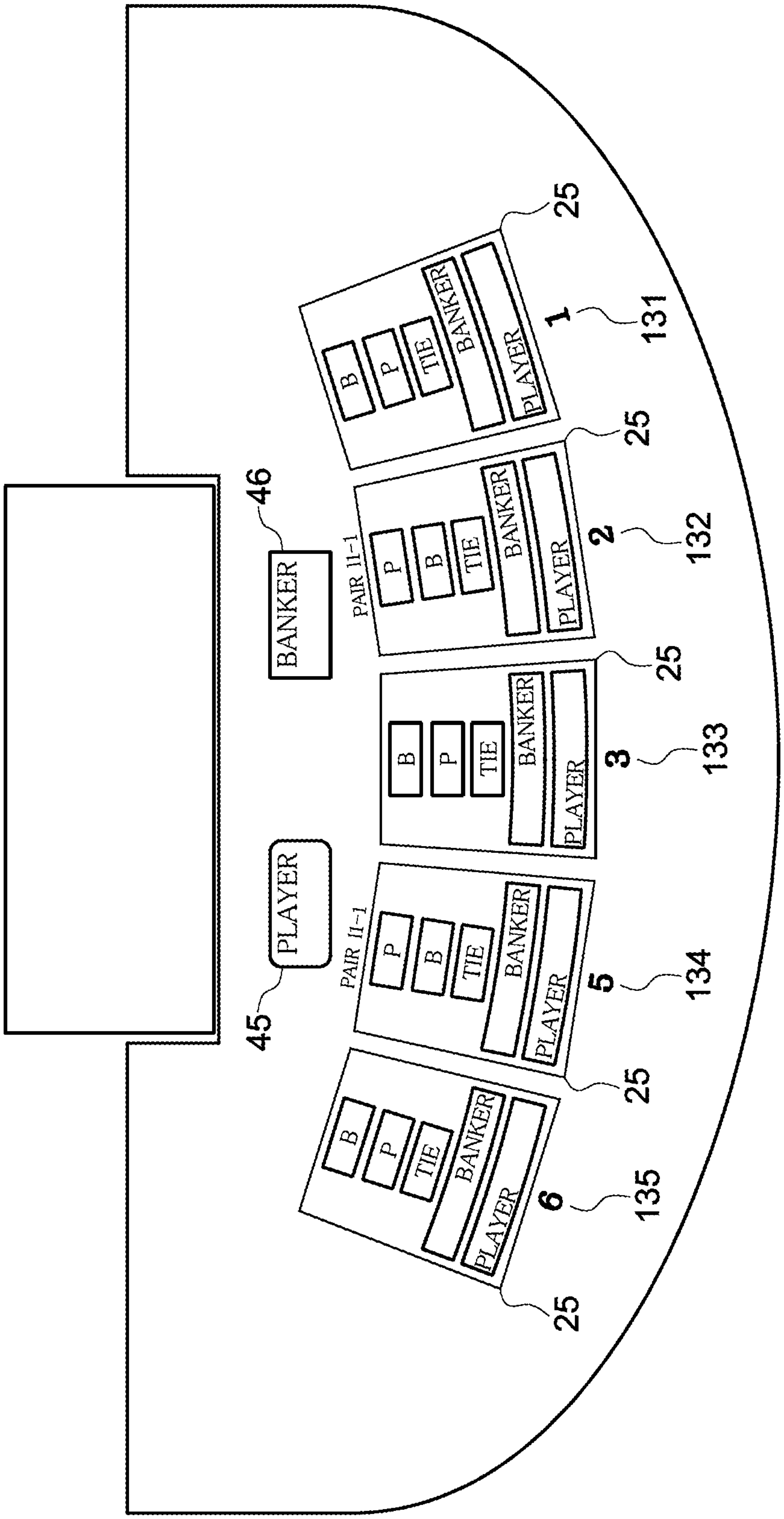
FIG. 9 is a view of game tables according to another embodiment of the present disclosure.
Figure 10:
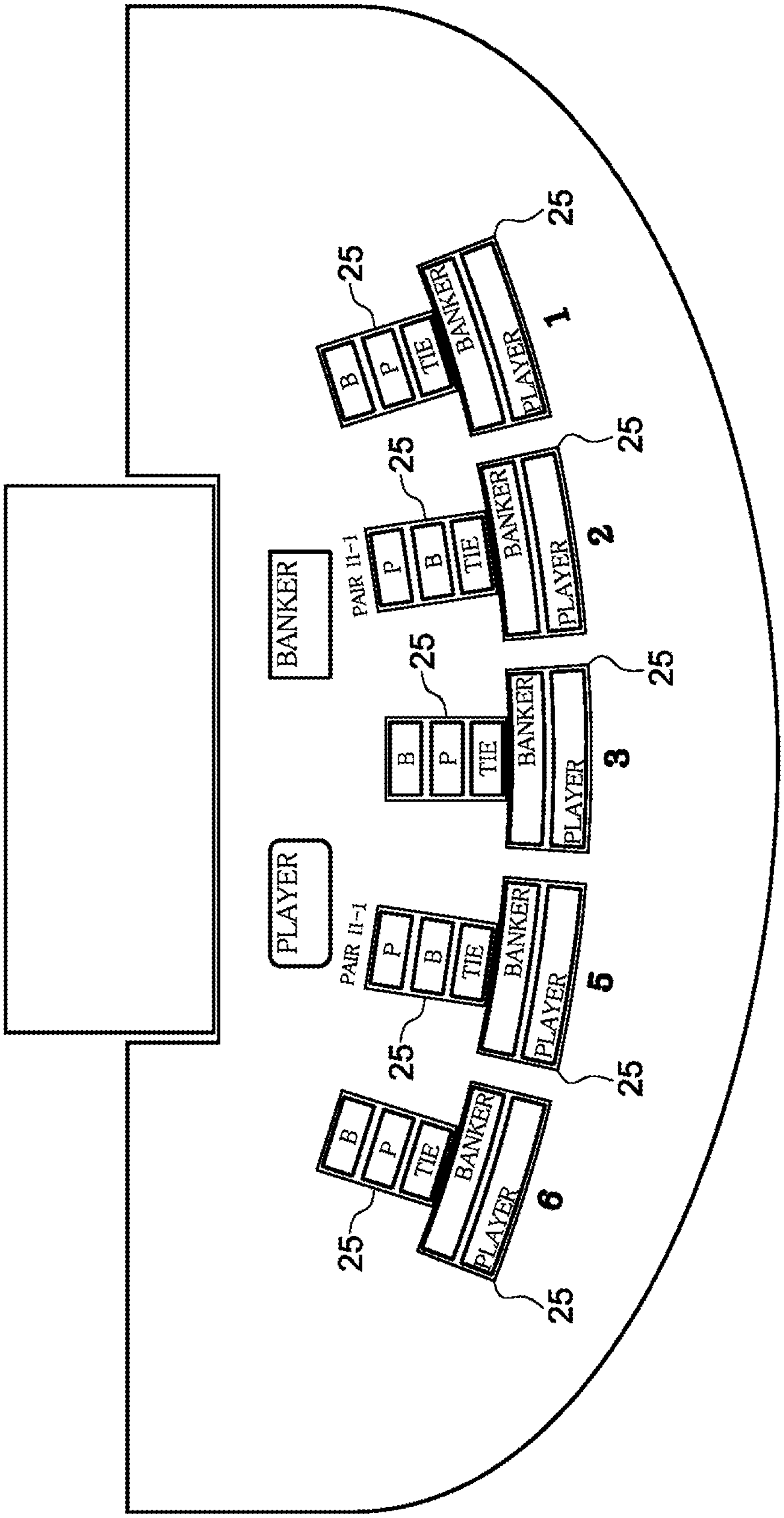
FIG. 10 is a view of game tables according to another embodiment of the present disclosure.
Figure 11:
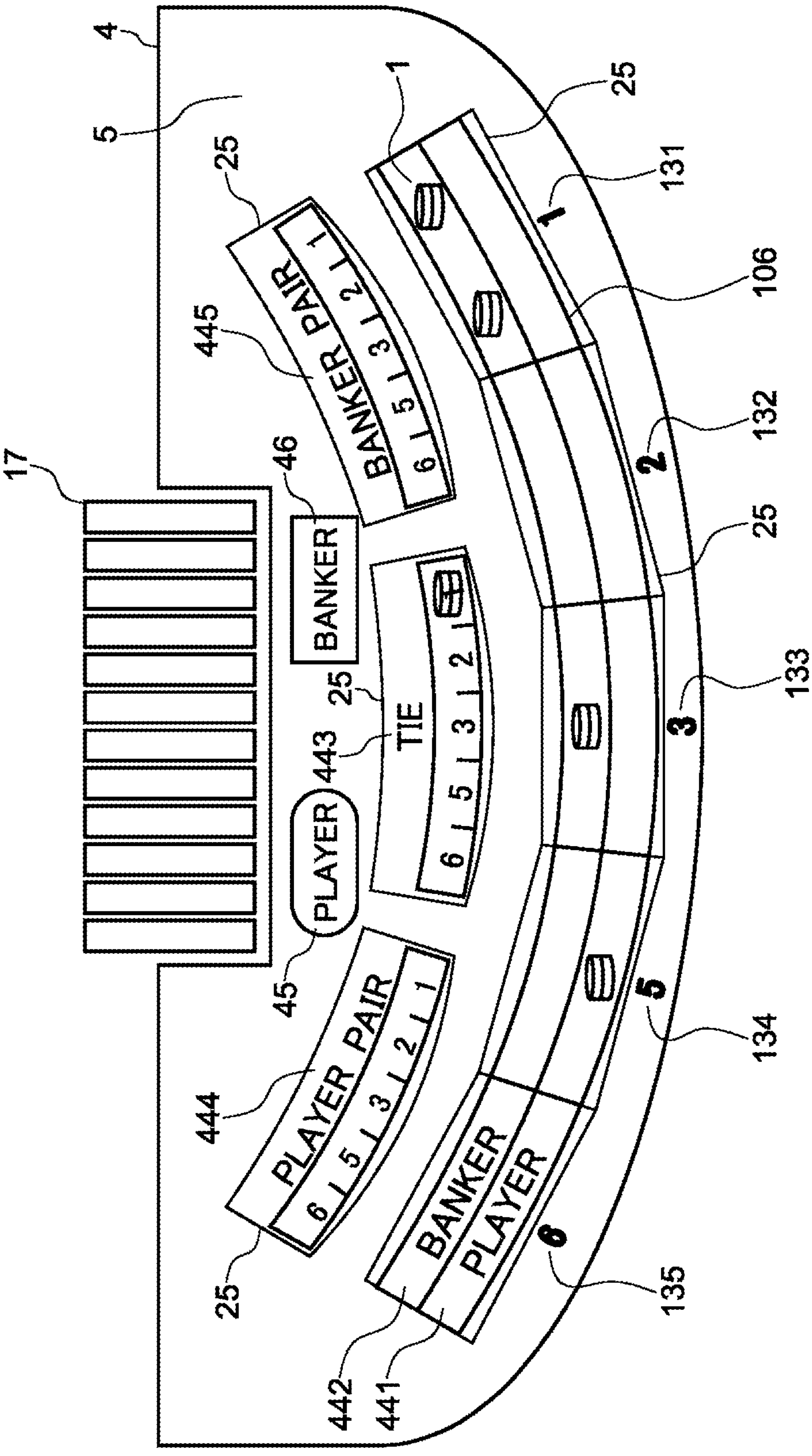
FIG. 11 is a view of game tables according to another embodiment of the present disclosure.
Figure 14:
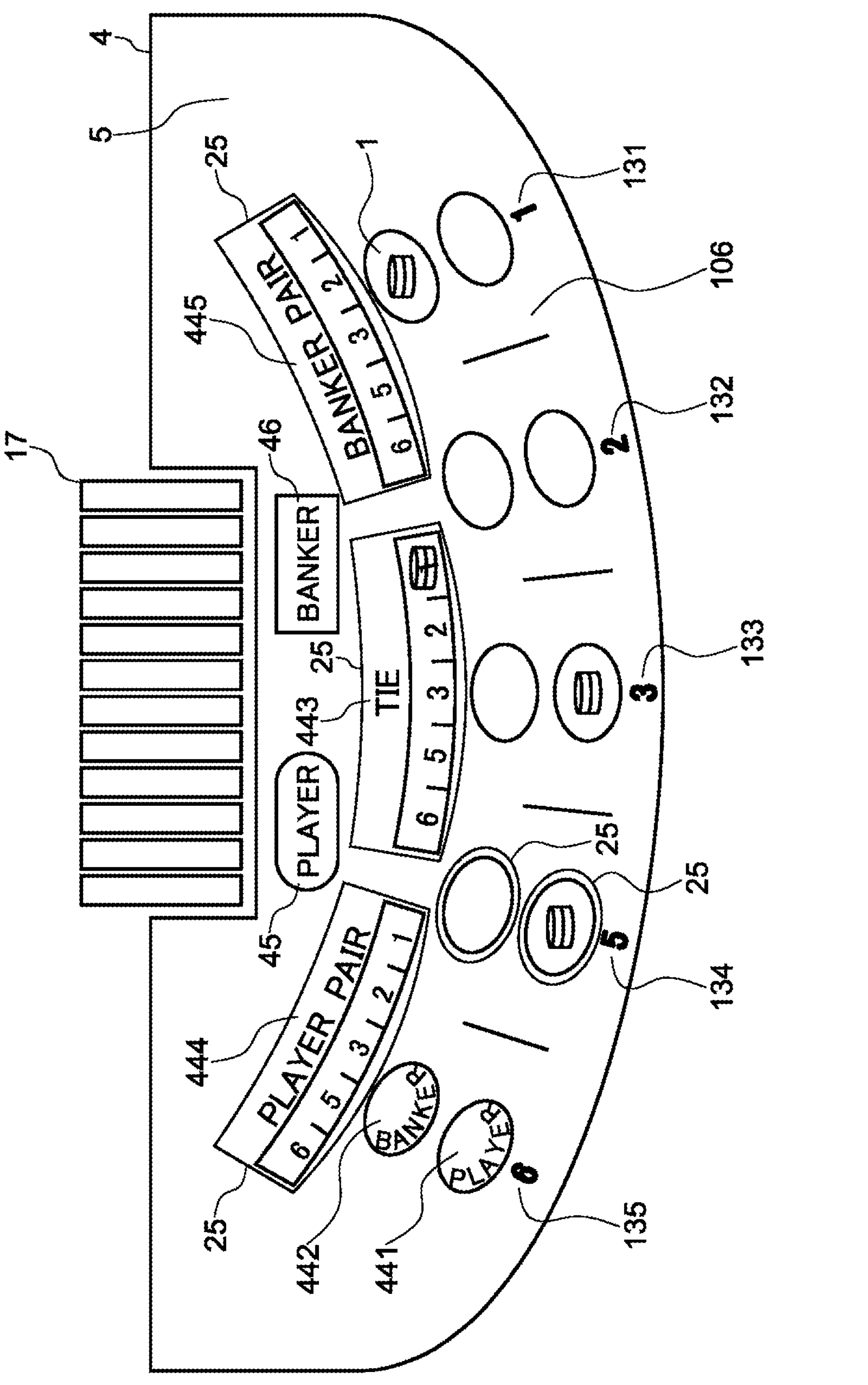
FIG. 14 is a view showing a conventional layout for reading an RFID.

As shown in FIG. 9, the chip reader 25 may have one read area that is the entire bet area every sitting number, or as shown in FIG. 10, the chip reader 25 may have one read area, every sitting number, such that a player bet area and a banker bet area form one read area, and a tie bet area, a player pair bet area, and a banker pair bet area form one read area. As shown in FIGS. 11 and 14, the side-bet bet areas of the tie bet area, the player pair bet area, and the banker pair bet area individually form one read area.

Figure 12:
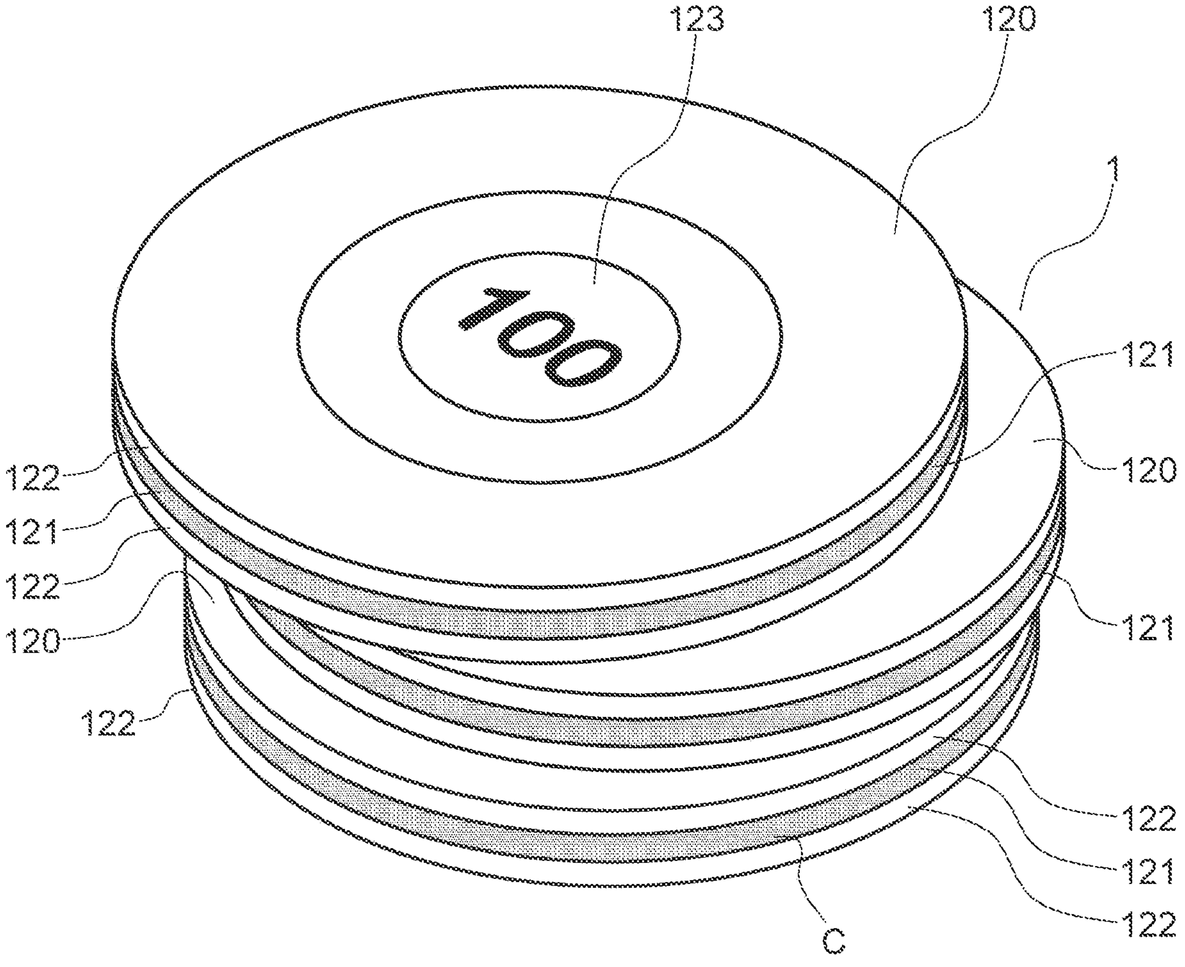
FIG. 12 is a perspective view showing a game token according to an embodiment of the present disclosure.
Figure 13:
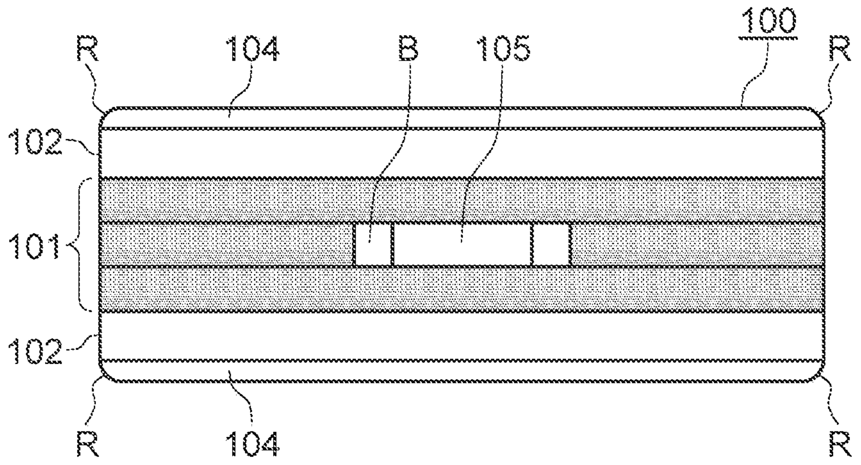
FIG. 13 is a cross sectional view showing a game token according to an embodiment of the present disclosure.

In the following, the game token 1 used in the embodiment of the present disclosure will be described. FIG. 12 is an outside view of the game token 1 for use in the present system, and FIG. 13 is a front cross sectional view. The game token 1 has a multi-layer structure in which a plurality of plastic layers having different colors is stacked, a colored layer 101 is included at least in the middle, and a white layer 102 or a pale color layer (which may be a layer in a pale color lighter than the colored layer 101, although not shown in the drawing) is stacked on both sides of the colored layer 101 in the middle. As described above, the multi-layer structure is provided in which the colored layer 101 is included, and the white layer 102 or the pale color layer (which may be a layer in a pale color lighter than the colored layer 101, although not shown in the drawing) is stacked on both sides of the colored layer 101 in the middle. Thus, as shown in FIG. 12, a stripe pattern is formed on the side surface in the stacking direction, the color of the colored layer 101 is changed (red, green, yellow, or blue, and any other color), and the type of the game token 1 (10 points, 20 points, 100 points, 1,000 points, and the like) can be identified.

As shown in FIG. 13, the colored layer 101 may be formed of a plurality of colored layers (in FIG. 13, three layers). Since the plurality of colored layers (in FIG. 13, three layers) is subjected to thermocompression bonding, the state of the three-layer structure fails to be visually seen as shown in FIG. 13, and FIG. 13 shows three layers for explanation. In the middle layer among the three layers of the colored layer 101, a partial bore B is provided, and an RFID is built in the bore B.

The structure of the game token 1 is not limited to the plastic stacked structure, and may be one having the similar appearance as the colored layer 101 in the appearance.

In the following, a method by which the image analyzer 12 analyzes the game token 1 is shown in detail. The image analyzer 12 subjects images recorded on the recorder 11 to image analysis, and recognizes at least two colors which are a specific color 121 that is at least partially imposed to the game token 1 and a reference color R that is present in the image and is different from the specific color 121. Note that the specific color 121 is at least partially imposed at a predetermined position of the game token 1 or in a predetermined shape. For example, the specific color 121 may be imposed as the colored layer 101, may be imposed on the side surface of the game token 1 in the circumferential direction, or may be imposed as a predetermined mark on the surface of the game token 1. The reference color R may be the color of a specific area at the game table 4, for example, or may be a color imposed at a place different from the specific color 121 in the game token 1.

The image analyzer 12 includes an artificial intelligence device 12*a* that specifies a specific color by deep learning technique, for example, and determines the number and the types of the game tokens 1 disposed at the game table 4. The image analyzer 12 may further determine the position of the game token 1 at the game table 4.

The image analyzer 12 acquires pluralities of images of the game token 1 and the reference color R applied at different illuminances, learns the acquired images and correct colors of the specific color 121 of the game token 1 and the reference color R in the images as teacher data by being taught by a person, and creates a learning model 13*a* (recognition program). Note that for the images of the game token 1 and the reference color R applied at the illuminances under the same conditions, since the specific color 121 and the reference color R are applied at the same illuminance, the relative relationship between the specific color 121 and the reference color R can be acquired. For example, the relative relationship between may be used for the recognition of the specific color 121.

A configuration may be provided in which the image analyzer 12 uses no artificial intelligence, and a center line C of the game token 1 may be extracted by a method in which the game token 1 is captured by a camera 212 and recorded as images, an image analysis result is used to measure the characteristics on images, such as shapes, lightness, chroma, and tint.

The artificial intelligence device 12*a* further includes a configuration in which a peripheral image in a predetermined range around the center line C that is extracted (e.g. a range of eight pixels orthogonal to the center line about the center line, for example) is subjected to image analysis, and at least two colors are recognized which are the specific color 121 and the reference color R that is different from the specific color 121 in the peripheral image. Note that when the peripheral image in a predetermined range around the center line C that is extracted is subjected to image analysis, the image may be analyzed as it is, or may be analyzed after image processing, such as color highlighting and noise removal for easy recognition of the specific color 121.

In summary, the artificial intelligence device 12*a* of the image analyzer 12 includes a configuration in which the center line C is extracted from the image of the game token 1, the peripheral image in a predetermined range about the center line C is subjected to image analysis, and at least two colors are recognized which are the specific color 121 and the reference color R that is different from the specific color 121 in the peripheral image. The artificial intelligence device 12*a* is an artificial intelligence device to which pluralities of peripheral images of the game token 1 and the reference color R applied at different illuminances are taught as teacher data.

In another embodiment of the present disclosure, the controller 14 includes a function that determines at least one of the situations: 1) in each of games, whether a chip is moved after card drawing is started, or during a period from the game start operation by the dealer to before the game outcome result is displayed by the card distributor; 2) after each of games is finished, whether a chip is moved by a person other than the dealer during a period in which the dealer is collecting chips bet by a loser among game participants; 3) after each of games is finished, whether a chip is added during a period in which the dealer is collecting chips bet by a loser among game participants; 4) after each of games is finished, whether the dealer makes a payment at the position of the chip bet by a winner among game participants; and 5) after each of games is finished, whether a winner among game participants receives a chip bet by the winner and a chip for payment.

The controller 14 may be configured to detect the movement of hands of the dealer and the game participants, the movement of chips, or the movement of hands and the movement of chips using the analysis result by the image analyzer and to determine at least one of the situations 1) to 5).

As a characteristic function of the invention of the present application, the controller 14 has functions shown in 1) to 5), and determines whether a fraud against the rules is practiced. That is, the controller 14 monitors the situations: 1) in each of games, whether the game token 1 is moved during a period from a signal indicating that card drawing is started obtained from the card distributor 3 or from the game start operation by pressing a start button 4*s* by the dealer 5 to before the game outcome result is displayed by the card distributor 3 based on information obtained by the image analyzer 12 using the camera 2; 2) after each of games is finished, whether a loser 6 falsely takes the game token 1 during a period in which the dealer 5 is collecting the game token 1 bet by the loser among game participants 6 based on information obtained by the image analyzer 12 using the camera 2; 3) after each of games is finished, whether a person other than the dealer 5 (a winner or a loser) adds the win game token 1W, or again places a new game token 1 during a period in which the dealer 5 is collecting the game token 1 bet by the loser among game participants 6 based on information obtained by the image analyzer 12 using the camera 2; 4) after each of games is finished, whether the dealer 5 correctly places the game token 1W for payment the position of the game token 1 bet by a winner among game participants 6 based on information obtained by the image analyzer 12 using the camera 2; and 5) after each of games is finished (the dealer 5 operates the card distributor 3 to display the outcome result on the display lamp 13), whether the winner 6W among the game participants 6 takes the game token 1 bet by the winner 6W and the game token 1W that is paid based on information obtained by the image analyzer 12 using the camera 2.

Note that in the embodiment, the image analyzer 12 or the controller 14 is devices having an artificial intelligence utilized structure or deep learning structure. However, specifically, the image analyzer 12 or the controller 14 may perform image analysis and the various ways of control using Scale-Invariant Feature Transform (SIFT) algorithms, Convolutional Neutral Network (CNN), deep learning, machine learning, or similar techniques. These techniques are techniques that subject captured images to image recognition to recognize targets included in the images. Specifically, nowadays, deep learning techniques having multi-layered neural networks are used to recognize targets highly accurately. Typically in the deep learning technique, layers are stacked across a plurality of stages in an intermediate layer between the input layer and the output layer of the neural network, and thus targets are recognized highly accurately. In the deep learning technique, attention is specifically focused on the convolutional neutral network that has a performance higher than recognizing targets based on conventional image feature values.

The convolutional neutral network learns labelled recognition target images, and recognizes main targets included in the recognition target images. In the case in which a plurality of main targets is present in the learned images, and a region is specified by a rectangle, the image corresponding to the specified region is labelled for learning. In the convolutional neutral network, a main target in the image and the position of the specified can also be determined.

The convolutional neutral network will be further described. In the target recognition process, edge extraction processing, for example, is applied to the recognition target image to extract a candidate region based on local features, the candidate region is inputted to the convolutional neutral network to extract feature vectors for sorting, and the sorted candidate region having the highest certainty factor is obtained as a recognized result. The certainty factor is a value indicating what degree the similarity of the entity of the image learned with a label to a certain image region is relatively higher than the similarity of other classes.

As described above, various embodiments of the present disclosure are described. The foregoing embodiments can be of course modified by a person skilled in the art in the scope of the present disclosure, and the devices of the present embodiment may be appropriately modified suited to games to be applied as necessary.

What is claimed is:

1. A management system for a table game comprising:
a game token having an RFID individually identifiable;
a game table on which a game is played using the game token;
a game recorder configured to record game tokens bet by game participants in a game played at the game table as images through a camera;
an image analyzer configured to subject the recorded image of the game token to image analysis;
a chip reader configured to read an RFID of the game token bet by game participants; and
a controller configured to determine an image analysis result by the image analyzer and a read result by the chip reader,
wherein:
the game table includes a plurality of bet areas including at least a player bet area and a banker bet area every sitting number,
the chip reader is configured to read the game token within one read area formed of a whole bet area of a sitting number, for each sitting number, or the chip reader is configured to read the game token within each of a plurality of areas separated from the whole bet area, a number of the plurality of areas is smaller than a number of the bet areas, and
the controller is configured to:
determine a type and a number of bet game tokens independently in bet areas including at least the player bet area and the banker bet area based on the image analysis result by the image analyzer;
determine whether a total amount of money or a total number of game tokens every sitting numbers or in each of the read areas based on the image analysis result by the image analyzer is matched with a total amount of money or a total number of game tokens every sitting numbers or in each of the read areas based on the read result of the chip reader; and
output a determined result.

2. The management system for a table game according to claim 1, wherein the controller is configured to output a sitting number having the determined result that is not matched.

3. The management system for a table game according to claim 1, wherein the controller is further configured to generate a signal indicating a possibility that an RFID of the game token is broken or a game token does not have an RFID when a total amount of money or a total number of game tokens every sitting numbers based on the read result of the chip reader is smaller than a total amount of money or a total number of game tokens every sitting numbers based on the image analysis result by the image analyzer.

4. The management system for a table game according to claim 1, wherein the controller is further configured to generate a signal indicating a possibility of a read error of the game token by the image analyzer when a total amount of money or a total number of game tokens every sitting numbers based on the read result of the chip reader is greater than a total amount of money or a total number of game tokens every sitting numbers based on the image analysis result by the image analyzer.

5. The management system for a table game according to claim 1, further comprising:
a database configured to store an ID of an RFID of the game token,
wherein the controller is configured to check an ID of an RFID based on the read result of the chip reader against an ID stored on the database, to determine whether the game token is a fake or not, and to output a determined result.

6. The management system for a table game according to claim 1, further comprising:
a chip tray configured to retain a game token used by a dealer at the game table;
a chip tray determination device configured to determine a type and a number of game tokens accommodated in the chip tray; and
a game result determination device configured to determine game results of games at the game table,
wherein the controller has:
a calculation function in which an income and expenditure of a casino side at the game table are calculated every collection and redemption of games using a measurement result of a position, an amount of money, and a number of game tokens based on a game result obtained from the game result determination device and the image analysis result by image analyzer,
a collection determination function in which after collection of loss game tokens bet by game participants is finished, an amount of money of game tokens that have to be collected which are calculated from positions, types, and a number of game tokens that are bet by game participants at the game table, and the game result is compared with an actually collected amount of money in the chip tray, it is determined whether a difference is present between an amount of money of game tokens that have to be collected and an actually collected amount of money, and it is determined whether a fraud or an error occurs in collection of game tokens, and
a redemption determination function in which a game token that has to be redeemed is redeemed, after redemption is finished, a total amount that has to be present on the chip tray based on an amount of money of game tokens that have to be redeemed at the game calculated from positions, types, and a number of game tokens that are bet by game participants at the game table and the game result is compared with an actual total amount on the chip tray, and when it is determined that a difference is present between a total amount that has to be present and an actual total amount, it is determined that a fraud or an error occurs in redemption.

7. The management system for a table game according to claim 1, wherein the controller is configured to:
identify the collected game token every sitting number based on information on an ID of an RFID of the game token that is collected and determined by the chip tray determination device and information on an ID of an RFID of the game token read by the chip reader;
compare an ID or an amount of money or a number of game tokens that are identified with an ID or an amount of money or a number of game tokens that have to be collected every sitting number determined using a measurement result of a position, an amount of money, and a number of game tokens based on a game result obtained from the game result determination device and the image analysis result by the image analyzer; and determine whether the amount of money or the number of game tokens is matched.

8. The management system for a table game according to claim 1, wherein the controller is configured to:

determine a type classified for each use application or each use purpose of the game token based on information on an ID of an RFID of the game token read by the chip reader in each of games; and store an amount of bet money or an amount of money collected or redeemed every of the type of the game token every sitting number.

9. The management system for a table game according to claim 8, wherein in a plurality of games, the controller is configured to store an accumulating total amount of bet money or an accumulating total amount of collected or redeemed money every type of the game token every sitting number.

10. The management system for a table game according to claim 8, wherein a type of the game token includes at least one of cash chip, rolling chip, and promotion chip.

11. The management system for a table game according to claim 10, wherein the controller is configured to identify an owner based on ID information on the rolling chip and to store an accumulating total amount of money of the rolling chip that is bet or an accumulating total amount of collected or redeemed money every owner.

12. The management system for a table game according to claim 1, wherein the chip reader is configured to:

read the game token for redemption placed on the chip reader every sitting number, and the controller is configured to:

compare an amount of money for redemption determined using a measurement result of a position, an amount of money, and a number of game tokens based on a game result obtained from the game result determination device and the image analysis result by the image analyzer with an amount of money of the game token placed every sitting numbers based on the read result of the chip reader; and determine whether an amount of money for redemption is matched or not; and output the determination.

13. The management system for a table game according to claim 12, wherein the controller is configured to:

display a result that is not matched when a determined result of the amount of money for redemption is not matched; and again make a determination and again output a result that is matched or not when an amount of money of the game token placed on the chip reader every sitting numbers read by the chip reader is changed.

14. The management system for a table game according to claim 12, wherein the controller is configured to:

compare an amount of money of the game token for redemption placed every sitting numbers with amounts of an increase and a decrease on the chip tray before and after redemption; and determine whether a difference is present.

15. The management system for a table game according to claim 12, wherein the chip reader includes a payment confirmation area disposed on a dealer side of the bet area, the payment confirmation area on which the game token for redemption is placed.

16. The management system for a table game according to claim 1, further comprising a game participant identification unit by a face recognition system or a player ID card, wherein the controller is configured to link the sitting number with information on the game participant identified by the game participant identification unit.

17. The management system for a table game according to claim 1, further comprising a display device configured to perform display based on an output from the controller.

18. The management system for a table game according to claim 1, wherein the game table further includes a side-bet bet areas, each of the side-bet bet areas is provided adjacently with bet area of each sitting number, the chip reader is configured to collectively read at least one of the side-bet bet areas, and the controller is configured to:

determine a type and a number of game tokens bet in the at least one side-bet bet area based on the image analysis result by the image analyzer;

determine whether a total amount of money or a total number of game tokens in the at least one side-bet bet area based on the image analysis result by the image analyzer is matched with a total amount of money or a total number of game tokens in the side-bet bet area based on the read result of the chip reader; and output a signal indicating a determined result.

19. A management system for a table game comprising:

a game token having an RFID individually identifiable;

a game table on which a game is played using the game token;

a game recorder configured to record game tokens bet by game participants in a game played at the game table as images through a camera;

an image analyzer configured to subject the recorded image of the game token to image analysis;

a chip reader configured to read an RFID of the game token bet by game participants; and a controller configured to determine an image analysis result by the image analyzer and a read result of the chip reader, wherein the game table includes a bet area formed of a player bet area, a banker bet area, and a side-bet bet area, the side-bet bet area is provided adjacently with bet areas every sitting number, the chip reader is configured to collectively read at least one of the side-bet bet areas, and the controller is configured to:

independently determine a type and a number of bet game tokens in the at least one side-bet bet area based on the image analysis result by the image analyzer;

determine whether a total amount of money or a total number of game tokens in the at least one side-bet bet area based on the image analysis result by the image analyzer is matched with a total amount of money or a total number of game tokens in the side-bet bet area based on the read result of the chip reader; and output a signal indicating a determined result.

20. The management system for a table game according to claim 19, wherein the controller is configured to output the side-bet bet area having the determined result that is not matched.

* * * * *